July 7, 1953 — H. E. FARMER — 2,644,357
POWER-OPERATED, GEAR CONTROLLED MULTIPLE SOCKET WRENCH
Filed May 17, 1951 — 4 Sheets-Sheet 1
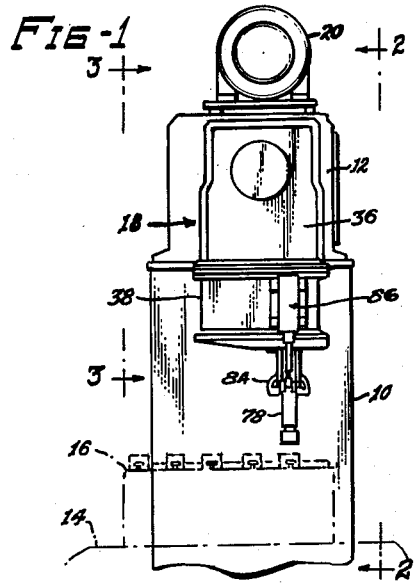
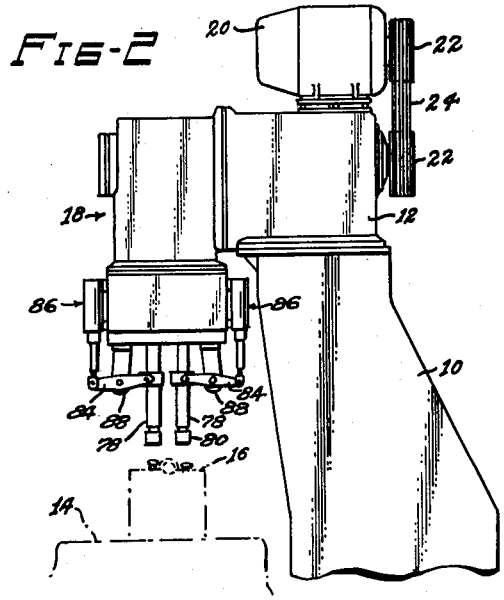
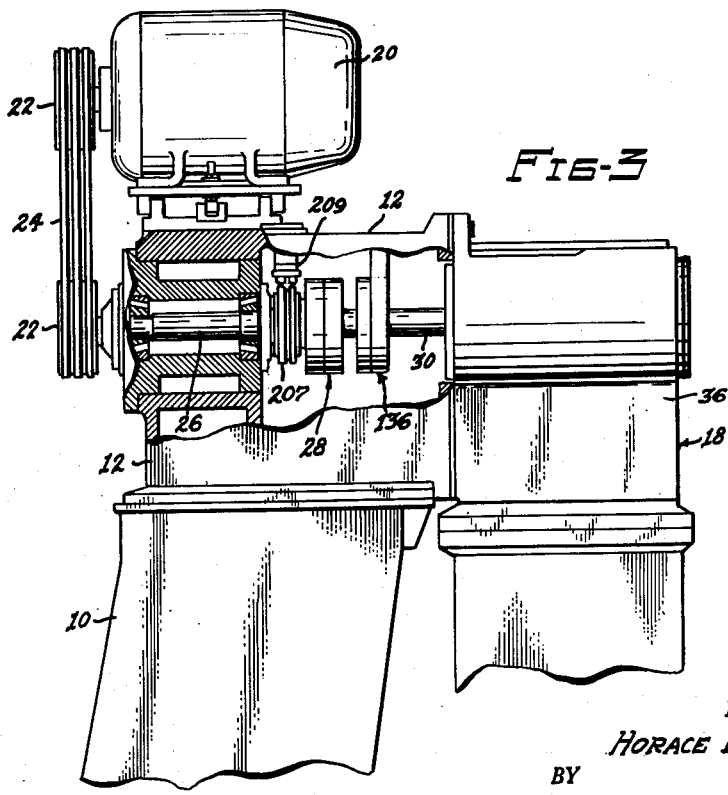
INVENTOR.
HORACE E. FARMER
BY
Wallace P. Lamb
ATTORNEY

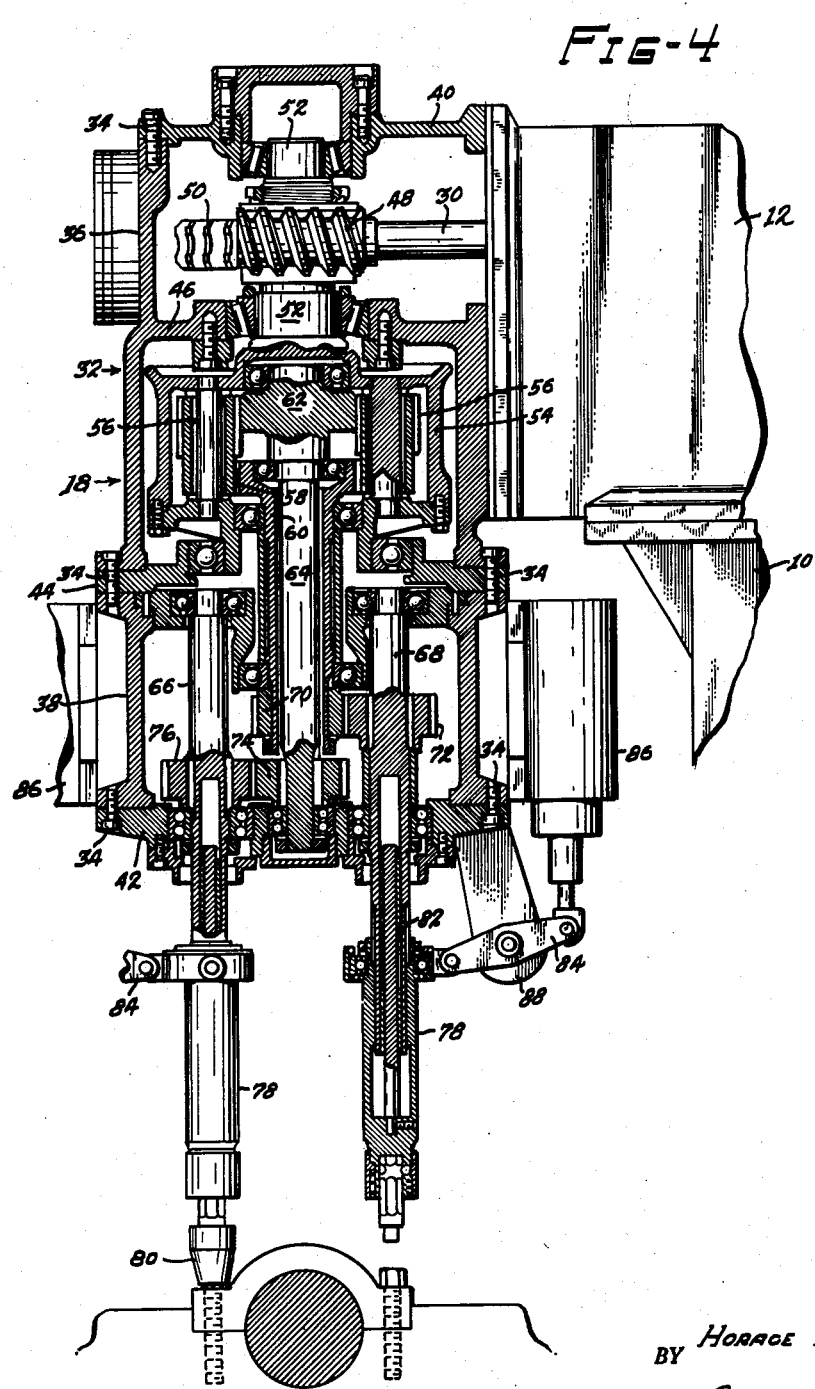

July 7, 1953 H. E. FARMER 2,644,357
POWER-OPERATED, GEAR CONTROLLED MULTIPLE SOCKET WRENCH
Filed May 17, 1951 4 Sheets-Sheet 3

INVENTOR.
HORACE E. FARMER
BY
Wallace P. Lamb
ATTORNEY

INVENTOR.
HORACE E. FARMER
BY
Wallace P. Lamb
ATTORNEY

Patented July 7, 1953

2,644,357

UNITED STATES PATENT OFFICE 2,644,357

POWER-OPERATED, GEAR-CONTROLLED MULTIPLE SOCKET WRENCH

Horace E. Farmer, Grosse Pointe Farms, Mich.

Application May 17, 1951, Serial No. 226,776

8 Claims. (Cl. 81—57)

This invention relates generally to control systems and particularly to controls for automatically controlling operation of rotary tool operating machines.

It is an object of the invention to provide an improved control system which will automatically control operation of a rotary tool driving machine in accordance with torque on the tool.

From another aspect of the invention, it is an object to provide an improved control system and rotary tool driving machine of a character such that the tool is stopped when torque thereon reaches a predetermined selected value.

More specifically, it is an object of the invention to provide automatically controlled apparatus which will tighten down a pair of threaded fasteners to the same torque under the control of an electronic, torque responsive control.

Other objects of the invention will become apparent from the following detail description taken with the accompanying drawings in which:

Fig. 1 is a front view of a threaded fastener tightening machine embodying features of my invention;

Fig. 2 is a side view of the machine of Fig. 1;

Fig. 3 is an enlarged, rear elevational view of an upper portion of the machine;

Fig. 4 is a vertical sectional view of a unit mechanism of the machine;

Figure 5:
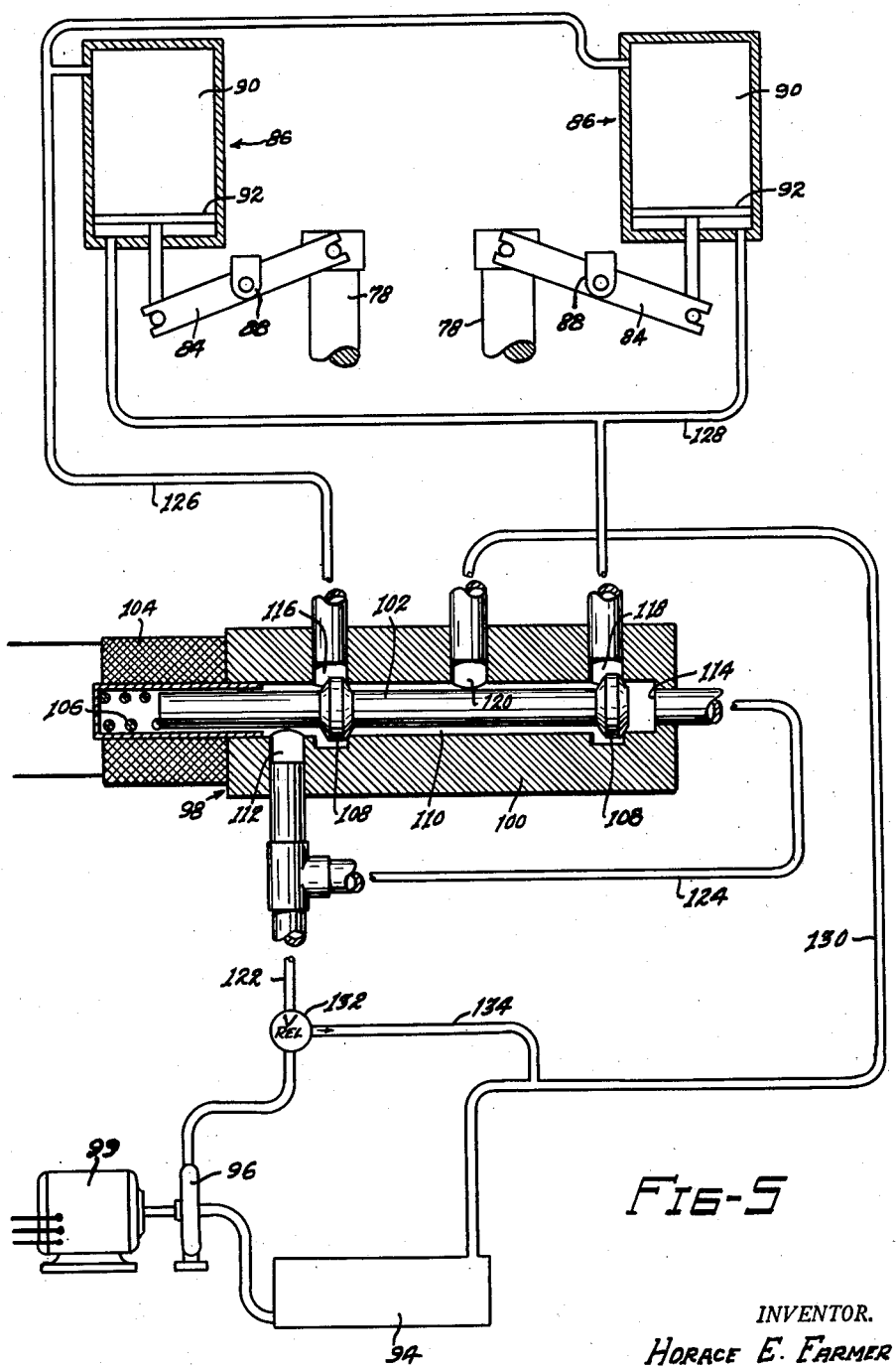
Fig. 5 is a view principally shown diagrammatically of a hydraulic power system for the machine of Fig. 1.

In Figs. 1 to 4 of the drawings there is shown a machine which is adapted particularly for use with engine assembly lines to tighten the cap screws of engine main bearings in pairs with equal, selected torque so as to avoid unequal warp producing strains in the bearings. The machine includes electrical power means to drive socket carrying spindles, differential mechanism driven by the power means to tighten the cap screws with uniform torque, hydraulic power means to advance and retract the socket members, and a control system electronically responsive to spindle torque to stop tightening of the cap screws at the desired torque.

Referring to the drawings by characters of reference, the machine of Figs. 1 to 4 inclusive comprises, in general, supporting structure including a base 10 and a housing 12. This supporting structure is located at one side of a conveyor 14 on which engines 16 are brought to the machine for the cap screw tightening operation. The housing 12 is mounted on and secured to the top of base 10 on which in turn is supported a differential power transmission mechanism or head 18 and an electric power means or motor 20. The differential head 18 is mounted on the front of the housing 12 in position to overlie the engine conveyor 14 and the electric motor 20 is mounted on the top of housing 12.

Figure 6:
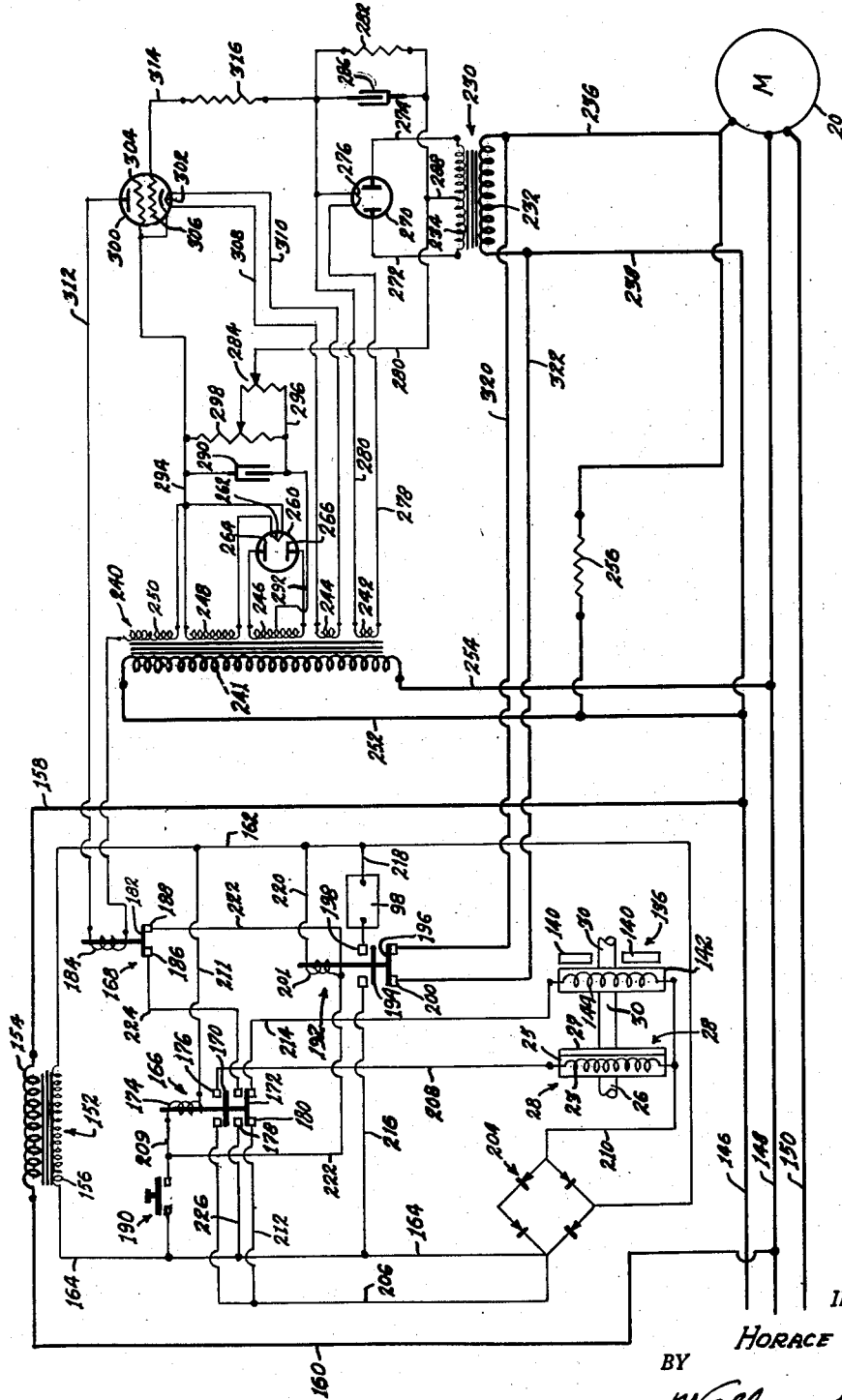
Fig. 6 is a diagrammatic view of an electrical control system for the machine and hydraulic power system.

The electric motor 20 drives the differential mechanism 18 through driving devices which include pulleys 22, V driving belts 24, main drive shaft components 26, 30, and a clutch 28. Journaled on suitable bearings within housing 12, the main drive shaft components 26, 30 are axially aligned and shaft 30 has an end projecting into housing 12, as shown by Fig. 3. The clutch 28 is adapted to couple main shaft components 26, 30 together and is an electrically operated or magnetic clutch which when de-energized functions to disengage the shafts and consequently discontinue operation of the differential. In Fig. 6, the magnetic clutch 28 is diagrammatically represented as comprising a coil 23, an armature 25 and a clutch plate 27. In the machine heretofore described, the motor 20 operates continuously during operation of the assembly line and the clutch 28 operates to control operation of the differential mechanism by coupling and/or decoupling shafts 26, 30.

The differential mechanism 18 is housed within a tubular casing 32 which is sectionally constructed in the interests of manufacture and assembly and the sections secured together, such as by means of studs 34. Preferably the casing includes an upper section 36 and a lower section 38. Bearing retainer plates 40, 42, respectively, close the top and bottom of the casing and intermediate plate 44 and internal wall 46 provide additional support for bearings.

Extending through the side of the upper casing section 36 is main drive shaft component 30 on which a worm gear 48 meshes with and drives a worm wheel 50. Worm wheel 50 is fixed to a vertical stub or differential drive shaft 52 which is journaled in vertically spaced bearings retained respectively in the top and bottom bearing plates 40, 46. Integral with stub shaft 52, below wall 46, is a rotatable arm or spider 54 that carries a number of radially spaced pinion gears 56. These pinion gears 56 mesh with a gear 58 affixed to the upper end of a tubular shaft 60 and also mesh with a gear 62 which is integral with and on the upper end of a second shaft 64. Shaft 64 is journaled within the tubular shaft 60 and these shafts have their common vertical axis of rotation in alignment with the axis of rotation of the pinion gear spider 54.

Journaled in the lower casing section 38 is a pair of spaced vertical spindles 66, 68, which are rotated respectively by or from shafts 60 and 64. Shafts 60, 64 extend between the spindles 66, 68, parallel thereto. On shaft 60, a gear 70 meshes with a similar gear 72 on spindle 68 and on shaft 64 a gear 74 meshes with a similar gear 76 on spindle 66. Thus, it will be understood that the differential divides the driving shaft foot pounds between the pair of spindles 66, 68 so that when the load is applied the screws are tightened at the same torque.

Each of the spindles 66, 68 has a lower end, vertically movable sleeve 78 which, at its lower end carries a nut turning socket member 80. The sleeves 78 are splined, as at 82, to their respective spindles to rotate therewith and to allow for vertical movement of the sleeves to engage and/or disengage the sockets from the main bearing cap screws.

A pair of operating levers 84 are preferably provided respectively to move the sleeves 78 and, I provide a hydraulic power system having individual power units 86 for operating the levers 84. The levers 84 may be pivoted on brackets 88 which may be secured to the casing bottom plate 42. As shown, the power units 86 may be bolted or be otherwise suitably secured to opposite sides of the casing lower section 38. In the diagrammatic view of the hydraulic system (Fig. 5), the power units 86 are each represented as comprising a cylinder 90 and a piston 92.

In general, the hydraulic power system comprises, a reservoir 94, a pump 96, a control 98, and the power units 86. The pump 96 may be driven by an electric motor 99 or by any other suitable source of power.

The control 98 is preferably a solenoid valve of the type generally referred to in the control industry as a two-directional, four-way valve. This valve, shown more or less diagrammatically in Fig. 5, comprises, in general, a body 100, and a valve rod 102. One end of valve rod 102 is surrounded by a magnetic coil 104 and thus functions as a movable armature. A coil spring 106 acts to move the valve rod 102 in one direction upon de-energization of coil 104. On the rod 102 is a pair of spaced valve members 108 which are adapted to control flow through a passage 110 in the valve body. Passage 110 has a pair of inlet ports 112, 114, a pair of outlet ports 116, 118, and a discharge or return port 120.

A conduit 122 from the pump 96 connects to valve inlet port 112 and by means of a branch conduit 124 connects the pump to the other valve inlet 114. On the outlet side of the valve, a conduit 126 connects outlet 116 to the upper ends of cylinders 90 and another conduit 128 connects the other outlet 118 to the lower ends of the cylinders. Return valve outlet 120 is connected by a conduit 130 to the reservoir 94. Preferably, a suitable pressure regulator or valve 132 is provided in the delivery conduit 122 having a return conduit 134 to the reservoir 94. From the above description, it will now be seen that with the valve rod 102 in the position shown, the force of the hydraulic liquid under action of the pump will be directed to the upper ends of cylinders 90 to depress the pistons 92 and raise spindle sleeves 78 and that when coil 104 is energized, the direction of liquid flow will be reversed to move the spindle sleeves downward.

I have found that because of the slow action of the hydraulic system compared to the action of the magnetic clutch, the inertia of the differential mechanism tends to rotate the engine head cap screws beyond the point of desired torque before the spindle carried socket members are withdrawn by the hydraulic power elements. To overcome this, I provide a magnetically operated brake 136 for the differential mechanism. Preferably, the brake 136 is located within housing 12 on shaft 30 and is adapted to act on and stop rotation of shaft 30 when magnetic clutch 28 is de-energized. As shown in Fig. 6, the magnetic brake 136 is represented diagrammatically as comprising, a pair of brake discs 140, an armature 142 and a coil 144. Any of the suitable well-known types of magnetically operated brakes may be used.

The electric drive motor 20 is illustrated as a three phase motor which is connected to a suitable source of electric power by main leads 146, 148, and 150. A transformer 152 is provided to lower the potential suitably for control instrument circuits and comprises, in general, the usual primary coil 154 and secondary coil 156. The transformer primary 154 is connected by lead wires 158 and 160, respectively, to the main leads 146 and 148. Connected to terminals of the transformer secondary 156 are lead wires 162 and 164 of a circuit which includes the magnet of clutch 28, magnet of brake 136 and the hydraulic system solenoid 98. A pair of control relays 166, 168 are provided to control the circuits of the magnetic clutch 28, magnetic brake 136 and the hydraulic solenoid 98. Relay 166 is a two-pole relay which is normally open with respect to the circuits of the magnetic clutch 28 and hydraulic solenoid and is normally closed with respect to the magnetic brake 136. Relay 168 is a single pole switch which is normally closed and when energized opens the circuits of the magnetic clutch and solenoid.

Diagrammatically, the relay 166 is represented as comprising a movable armature carrying a pair of switch contacts 170, 172, a coil 174 and three sets of fixed contacts 176, 178, and 180. Similarly, the single pole relay 168 is represented as comprising a movable armature carrying a switch contact 182, a coil 184 and a pair of fixed contacts 186, 188.

In series circuit with the transformer secondary 156 and relay coil 174 is a push button starter switch 190, and to shunt switch 190 is a circuit holding, time delay relay 192 which is adapted to maintain coil 174 energized although push button switch 190 is released. Relay 192 comprises, in general, a movable armature carrying a pair of switch contacts 194, 196, a pair of fixed contacts 198, 200, and a coil 201. As shown, relay contacts 198 are normally open and contacts 200 are normally closed.

From one terminal of the transformer secondary 156, lead wire 162 connects to the A. C. terminal of a rectifier 204 which is provided to change A. C. current to D. C. for the electromagnets of brake 136 and clutch 28. Lead lines 206, 208, respectively, connect relay terminals 176 to one D. C. terminal of rectifier 204 and to one end of the clutch magnetic coil 23, the other end of coil 23 being connected by a lead wire 210 to another D. C. terminal of rectifier 204. In Fig. 3, the numeral 209 designates a brush or ring contact 207 to connect clutch 28 in circuit. Similarly, relay contacts 180 are respectively connected by lead wires 212, 214 to lead 206 and one end of brake magnetic coil 144, the other end of the coil being connected by lead 210 to the rectifier. Relay coil 174 is connected to opposite terminals of transformer secondary 156 by lead wires 209, 211, in the former of which the push button switch 190 is located. From the above it will be seen that when relay 166 is energized, the magnetic clutch 28 will be energized to couple the main drive shaft components 26, 30 to the differential tool driving mechanism and at the same time the magnetically operated brake 136 will be de-energized.

Solenoid 98 is connected across leads 162, 164 by lead wires 216, 218 and is energized when relay contacts 198 are closed. Relay coil 201 has one end connected by lead wire 220 to lead 162 and has its other end connected to a lead wire 222 which has one end connected to relay coil 174 and the other end connected to relay contact 188. From relay contact 186, a lead wire 224 connects one contact 178 to relay 166 which has its other contact 178 connected by a lead wire 226 to lead 164.

When starter button 190 is pressed, relay coil 174 and relay coil 201 are energized. Energization of relay coil 178 closes contacts 176 which energizes clutch 28 to start driving of the differential drive by motor 20. Also, contacts 178 are closed which holds both relay coil 174 and solenoid relay coil 201 energized although push button 190 is released. In addition, contacts 180 are opened, de-energizing the magnetic coil 144 of brake 136 which then releases, this occurring simultaneously with the energization of the clutch 28. The holding circuit established upon pressing starter button 190 is as follows: From one end of transformer secondary 156, lead wire 164, lead wire 226, relay contacts 178, lead wire 224, normally closed relay contacts 186, 188, lead wire 222, relay coil 201, lead wire 220 and lead wire 162 back to the transformer secondary 156. Thus, it will be seen that although starter button 190 is released both relay coils 174 and 201 will remain energized.

As previously mentioned, the solenoid controlling relay 192 is a so-called time delay relay so that upon energization of its coil 201, contacts 198 are not immediately closed. This time delay is to allow the motor 20 to bring the differential drive up to operating speed before the solenoid valve 98 is energized to move the spindle carried sockets down to engage the nuts.

Relay 168 is controlled by sensitive electronic devices which respond to increasing torque on the nut tightening spindles as reflected in corresponding increase in load on the spindle driving motor 20. The circuit of the electronic devices includes a transformer 230 having a primary coil 232 and a secondary coil 234. One end or terminal of the primary coil 232 is connected by a lead wire 236 to the motor 20 and the other end of the primary coil 232 is connected by lead wire 238 to main lead wire 146. A second transformer 240 is provided having a primary coil 241 and secondary coils 242, 244, 246, 248 and 250. Opposite ends of the primary coil 241 are respectively connected to main leads 146, 148 by lead wires 252, 254. A resistance 256 is connected to lead wire 252 and to the transformer primary 232 such that the resistance and coil are in parallel circuit with motor 20.

A rectifier tube 260 is provided having the usual heater 262 and plates 264, 266. Similarly, a second rectifier tube 270 is provided having its plates connected respectively to opposite ends of the transformer secondary 234 by lead wires 272, 274. The heater, as at 276, of rectifier tube 270 is connected by lead wires 278, 280 respectively to opposite ends of the transformer secondary coil 242, and in lead wire 280 is a resistance 282 connected to a potentiometer 284. A condenser 286 is provided in parallel circuit with resistance 282 and is in turn connected to the transformer secondary coil 234 by lead 288. A second condenser 290 is connected by lead wires 292, 294 to opposite terminals of the transformer secondary 246. Also, the condenser 290 is connected to the potentiometer 284 by a lead wire 296, and across lead wires 292, 294 is a resistance 298 which is therefore also connected to the potentiometer 284.

An electronic tube 300 is responsive to increase in load on motor 20 and controls operation of relay 168. Electronic tube 300 comprises, in general, a heater 302, an anode 304 and a cathode 306. The heater 302 is connected by lead wires 308, 310 respectively, to opposite ends of the transformer secondary coil 244. Lead wire 312 connects anode 304 to one end of relay coil 184 which has its other end connected to transformer secondary 250. To the opposite end of transformer secondary 250 is connected cathode 306 by the lead wire 294. Another lead wire 314 connects the control end of the cathode 306 to the positive end of the resistance 282 and in lead wire 314 is another resistance 316.

The transformer secondary coils 242, 244, 246, 248 and 250 effect heating of the heaters of rectifier tubes 260, 270, and of the heater 302 of electronic control tube 300. The rectifier tube plates 264, 266 are connected to the transformer secondary coil 246 so that a direct voltage is developed across resistance 298. Condenser 290 is a filter type to filter the pulsating direct current delivered by the rectifier tube 260 to obtain a steady direct current.

Main leads 148, 150 are connected directly to motor 20, but main lead 146 is connected in circuit such that current flowing therethrough flows through the parallel combination of resistance 256 and transformer primary coil 232 and then to the motor 20. Thus, if the current requirement to the motor 20 increases, there will be a corresponding increase in the voltage applied to the transformer primary coil 232. This voltage is stepped up and applied to the plates of rectifier tube 270 which produces a pulsating direct voltage which is filtered to a steady direct voltage by condenser 286, thereby producing a steady direct voltage across resistance 282.

Since the voltage across resistance 282 is a function of the current flowing to motor 20 through lead 148, any change in current requirements to motor 20 will effect a corresponding change in voltage developed across resistance 282.

The positive end of resistance 282 is connected to the control end of tube 300 and the positive end of resistance 298 is connected to the cathode of the tube 300. Resistance 282 has its negative end connected to the adjustment arm of potentiometer 284. The resistance of potentiometer 284 is connected across a portion of the resistance 298 at the negative end thereof. By varying the position of the potentiometer arm, the potential difference between the positive end of resistance 298 and resistance 282 can be varied and, hence, the potential difference between the cathode and the control grid of tube 300. The anode of tube 300 receives its power through the relay coil 184 from the transformer secondary coil 250. When the control grid of the tube 300 is made slightly negative with respect to its cathode, the tube 300 will not conduct and the relay coil 184 will remain de-energized. However, when the control grid of tube 309 is at zero potential or slightly positive with respect to its cathode, the tube 300 will conduct and relay coil 184 will be energized.

With the motor 20 operating under normal load, the potential of the control grid of tube 300 with respect to its cathode is initially adjusted by means of the potentiometer 284 so that tube 300 is not conducting current and consequently relay coil 186 is de-energized. Or, in other words, by means of the potentiometer 284, the motor load at which control tube 300 will function to energize control relay 168 may be adjusted, as desired. If the load on motor 20 increases, the voltage across resistance 282 will, of course, also increase and if the increase reaches the value for which the potentiometer is set, the control grid of tube 300 will become positive with respect to its cathode. As a result relay coil 184 will be energized to open the circuits of the magnetic clutch and the hydraulic solenoid to the end of discontinuing tightening of the engine head nuts.

Contacts 200 of time delay relay 192 are respectively connected across leads 236, 238 by lead wires 320, 322. This shunt circuit together with the time delay action of relay 192 allows the motor 20 to bring the differential device up to proper speed without affecting the electronic control tube 300.

Operation

When starter switch button 190 is pushed by the machine operator, relay coils 174 and 201 are both energized, coil 201 acting as previously mentioned to hold relay closed although the push button is released. Closing of relay contacts 176 energizes magnetic clutch 28, and opening of contacts 180 de-energizes magnetic brake 136. Clutch 28 now acts to couple the motor 20 to differential 18 and rotate the cap screw tightening spindles 66, 68. After a determined time delay sufficient to give motor 20 time to bring the differential up to operating speed, the relay contacts 198 will close to energize the hydraulic solenoid valve 98. Valve 98 will now be shifted to the left, facing Fig. 5, directing fluid pressure to the bottom of the pistons 92. As the pistons 92 move up under the fluid pressure, they operate levers 84 which move the nut receiving socket members 80 down over the engine bearing cap screws to be tightened. The differential mechanism, driving the spindle carried socket members 80, turns the cap screws down until the torque on each is the same. For example, if the load on the driving shaft is say 170 foot pounds, this load is divided by the differential equally between the spindles which means that when the input on one spindle reaches 85 foot pounds, the spindle stops, while the other continues until 85 foot pounds is reached. In this way, the cap screws are turned down without creating such torque as might affect the torque control device after which the spindles act together to tighten the screws until the desired torque setting of the electronic control is reached. When the desired torque on the screws is reached, a corresponding increase in load on motor 20 will cause electronic tube 300 to become positive and energize relay coil 184 which then breaks the circuit of both of the relays 168 and 192. This opens contacts 176 which de-energizes clutch 28 to effect disengagement between motor 20 and differential 18. Also, relay contacts 180 are closed to energize brake 136 which acts to oppose inertia of and stop the differential 18 so that the cap screws will not be tightened beyond the desired torque. Simultaneously with the de-energization of the magnetic clutch 28, the relay contacts 198 are broken to de-energize the solenoid valve 28. This valve then moves to the right, facing Fig. 5, to reverse direction of liquid flow which through movement of pistons 92 and levers 84, retracts or moves the socket members 80 out of engagement with the cap screws and the various devices and controls and then is in position to repeat the cycle of operation.

While I have shown and described my invention in detail, it will be understood that the invention is to be limited only by the spirit and scope of the appended claims.

I claim:

1. In an apparatus of the character described, a rotary tool movable toward and away from a work piece, power means operable to move said tool toward and away from the work piece, an electric motor for rotating said tool, an electrically operated clutch operable to couple said motor and tool together, an electrically operated control operable to control said power means, and a control responsive to torque on said tool controlling both said clutch and said electrically operated control.

2. In an apparatus of the character described, a rotary tool movable bodily toward and away from a work piece, power means operable to move said tool toward and away from the work piece, an electric motor for rotating said tool, an electrically operated clutch operable to couple said motor and said tool together, an electrically operated control operable to control said power means, and electrically controlled brake arranged to stop rotation of said tool, and a control responsive to torque of said tool operable to control said electrically operated clutch and control and brake.

3. In an apparatus of the character described, a rotary tool movable bodily toward and away from a work piece, hydraulic power means operable to move said tool toward and away from the work piece, an electric motor for rotating said tool, a magnetic clutch operatively connecting said electric motor and said tool, a magnetic valve controlling said hydraulic power means, switch means controlling said magnetic clutch and said magnetic valve, and control means responsive to torque of said tool controlling said switch means.

4. In an apparatus of the character described, a pair of rotary tools, an electric motor, a differential gear mechanism driven by said motor and driving said rotary tools, hydraulic power means operable to move said pair of rotary tools lineally toward and away from a work piece, a solenoid valve controlling said hydraulic power means, a magnetic clutch operatively connecting said electric motor and said differential gear mechanism, means including switch means connecting said solenoid valve and said magnetic clutch in series circuit, and an electronic control controlling said circuit.

5. In apparatus of the character described having a rotatable tool movable with respect to a work piece by hydraulic power means, the combination of an electric motor to rotate the tool, a magnetic clutch controlling operation of the tool by said electric motor, a solenoid valve controlling movement of the tool by the hydraulic power means, a time delay relay controlling said solenoid valve, a control relay operable to energize said magnetic clutch and said time delay relay, and an electronically controlled relay controlling said control relay and said time delay relay in response to changes in load on said electric motor.

6. In apparatus of the character described having a rotatable tool movable by hydraulic power means with respect to a work piece, the combination of an electric motor to rotate the tool, a magnetic clutch operable when energized to couple said motor to the tool, a magnetic brake operable when energized to stop rotation of the tool, a solenoid valve operable when energized to control movement of the tool with respect to the work piece, a time delay relay controlling energization of said solenoid valve, a control relay controlling said magnetic clutch and said time delay relay, a normally closed switch in series with said relays, and an electronic tube operatively connected to said motor and operable when energized by predetermined increase in load on said motor to open said normally closed switch.

7. In an apparatus of the character described, a rotary tool movable toward and away from a work piece, a power element operable to move said tool toward and away from the work piece, a power element operable to rotate said tool, means operable to connect or disconnect said second power element and said tool, a control operable to control said first power element, and a control responsive to torque on said tool controlling both said means and said first control.

8. In an apparatus of the character described, a pair of rotary tools movable toward and away from a work piece, an electric motor, a differential gear mechanism driven by said motor and rotating said tools, power means operable to move said tools toward or away from the work piece, a clutch operable to couple and uncouple said motor and differential gear mechanism and a control responsive to torque on said pair of tools controlling both said clutch and said power means.

HORACE E. FARMER.

References Cited in the file of this patent

UNITED STATES PATENTS

| Number | Name | Date |
|---|---|---|
| 1,667,718 | Connell | May 1, 1928 |
| 1,800,248 | Coates | Apr. 14, 1931 |
| 1,823,426 | Ferris | Sept. 15, 1931 |
| 1,864,844 | Mevnier | June 28, 1932 |
| 1,977,490 | Sawyer | Oct. 16, 1934 |
| 2,069,882 | Hall | Feb. 9, 1937 |
| 2,106,365 | Tiano | Jan. 25, 1938 |
| 2,179,608 | Berg et al. | Nov. 14, 1939 |
| 2,430,522 | Melniczak | Nov. 11, 1947 |
| 2,444,602 | Hardie | July 6, 1948 |